Patented Dec. 27, 1927.

1,654,155

UNITED STATES PATENT OFFICE.

ALBERT H. ACKERMAN, OF CHICAGO, ILLINOIS, ASSIGNOR TO CATALYTIC CHEMICAL COMPANY, OF DENVER, COLORADO, A CORPORATION OF COLORADO.

REAGENT FOR TREATING MATERIALS CONTAINING HYDROCARBONS AND PROCESS OF MAKING THE SAME.

No Drawing. Original application filed December 21, 1925, Serial No. 76,901. Divided and this application filed February 16, 1927. Serial No. 168,819.

My invention relates to a chemical reagent for use in treating various hydrocarbon materials to improve and clarify them or to facilitate or improve the processing of the same or improve the quality thereof. The product herein described has been employed and found particularly satisfactory in the treatment of petroleum products either crude or refined. While I have particularly mentioned petroleum products, my invention may be employed wherever found applicable. My invention has among its objects the production of a reagent for the purposes set forth which is particularly efficient, inexpensive and satisfactory and consists in the materials and methods of manufacturing the same as are more particularly pointed out in the appended claims.

My improved product or reagent consists of naphthalene and anthracene, and alkaline-reacting substances as more fully set forth below. There may be some variation in the ingredients used in making up the reagent, as well as their relative proportions, depending upon the particular material to be treated, its source or the state that it is in at the time of treatment.

I prefer to make up the composition substantially in the manner now to be set forth by first treating naphthalene with caustic soda, sodium phosphate and ammonium carbonate, thoroughly grinding and co-mixing the same. For this purpose I have used 133 lbs. naphthalene, 56 lbs. caustic soda, 10 lbs. sodium phosphate, and 10 lbs. ammonium carbonate. This mixture is then mixed with anthracene, which has been treated with sulphuric acid and sodium hydroxide. I have also used in some instances a percentage of phosphate rock and I prefer generally to use a natural rock. I have secured satisfactory results with Florida phosphate rock. These materials are mixed in the proportions of substantially 21 lbs. anthracene, ½ lb. sulphuric acid, 2 lbs. sodium hydroxide and 3 lbs. of Florida phosphate.

In making up this composition, I have secured satisfactory results by taking the naphthalene, after treating it as above described, and after grinding the same for an interval, for example, 30 minutes or so, I add the latter or anthracene mixture also set forth above. I then further grind and co-mix the materials to get a thorough mixing and comminuting and reaction in the composition. I then prefer, after this short grinding, to add substantially 20 lbs. of granulated sugar and grind this composition for a short interval. The resulting mixture is then dumped and packed in air-tight containers until ready to be used.

This composition of material just described appears to attack carbon clusters in the various component parts of the petroleum product, especially in the waxes, and breaks down the binders and emulsions so that there is a very thorough breaking up of the carbon clusters as constituted at the beginning of the treatment.

As will be noticed in the above description of the method of compounding the composition, the naphthalene is treated with a mixture of alkalies, namely sodium hydroxide, sodium phosphate and ammonium carbonate. The purpose of so doing is to make the naphthalene more easily dispersible in the other ingredients. The sodium phosphate and the ammonium carbonate, together with the sodium hydroxide, furnish free alkali to the mixture. When used with mineral oils which contain appreciable amounts of suspended water, the alkali will cause a breaking of the emulsion. The presence of the ammonium carbonate furnishes a volatile alkali which is more penetrant to the oil portion of the emulsion, and hence attacks the water globules, causing them to coalesce, and thus serves to break the emulsion. The sodium phosphate, which on combining with the excess of sodium hydroxide used, serves to form trisodium phosphate, which is also an excellent water-in-oil-type of emulsion breaker. By first grinding the naphthalene with the alkalies, a finer subdivision of all the ingredients is possible.

The apparent contradiction in the directions for compounding the second portion of the composition is readily explained. The 21 parts of anthracene, when treated with the ½ part of sulphuric acid, become darker in color as the sulphuric acid appears to carbonize and destroy certain impurities in the anthracene. If pure 85% anthracene is used, this treatment will be unnecessary. The 2 lbs. of sodium hydroxide next added are for the purpose of completely neutralizing the sulphuric acid remaining after its action on the anthracene, as the finished composition is desired to have an alkaline reaction.

The Florida phosphate acts as a clarifying agent, as it has an adsorbent action, and will cause any dirt particles to adhere to the same and carry them to the bottom, into the water which separates from the emulsion of oil and water. The sugar finally added is a hydrophile colloidal material. Its function in the mixture is to overcome the hydrophobe colloids in the crude oil which stabilize the water-in-oil-type of emulsion, which usually accompanies such crude oil, or forms when still-residues are stored in open storage-reservoirs.

I have given the materials and proportions substantially as I have used the products, but these materials and proportions may be more or less varied, depending upon the material that is to be treated by my reagent, that is, whether it is crude petroleum, petroleum that has been otherwise treated or refined, whether it is residuum and whether there are to be any further refinery steps succeeding the treatment with my reagent.

I have found that my reagent is particularly desirable in treating crude oil, for treating "cracker" stock, lubricating stock and residuums, as more particularly pointed out in my co-pending application, Serial No. 75,472, I have particularly referred to the use of my reagent in the treating of petroleum products. It may be mentioned that the same may be employed for treating various materials containing hydrocarbons where it is desired to cause a breaking down of carbon clusters and a breaking up of the binders.

Having thus described my invention, it is obvious that various modifications may be made in the same without departing from the spirit of my invention, hence I do not wish to be understood as limiting myself to the specific combinations, proportions, processes or uses herein described.

I claim:

1. A composition of material comprising anthracene that has been treated with sulphuric acid, calcium phosphate as phosphate rock, napthalene, sodium hydroxide, sodium phosphate, ammonium carbonate, and sugar.

2. A composition of material comprising the reaction products resulting from the admixture of anthracene, sulphuric acid, calcium phosphate as phosphate rock, naphthalene, sodium hydroxide, sodium phosphate, ammonium carbonate, and sugar.

3. A composition of material comprising substantially 21 parts of anthracene which has been treated with ½ part sulphuric acid, 3 parts calcium phosphate as phosphate rock, 133 parts naphthalene, 58 parts sodium hydroxide, 10 parts sodium phosphate, 10 parts ammonium carbonate, and 20 parts sugar.

4. A composition of material comprising the reaction products resulting from the admixture of substantially 21 parts of anthracene, ½ part sulphuric acid, 3 parts calcium phosphate as phosphate rock, 133 parts naphthalene, 58 parts sodium hydroxide, 10 parts sodium phosphate, 10 parts ammonium carbonate, and 20 parts sugar.

5. The process of making a composition of material which comprises treating substantially 133 parts naphthalene with 56 parts of sodium hydroxide, 10 parts sodium phosphate and 10 parts ammonium carbonate; separately treating substantially 21 parts of anthracene with ½ part sulphuric acid adding thereto 2 parts sodium hydroxide and 3 parts phosphate rock; mixing and grinding the materials thus far enumerated, and thereupon adding 20 parts of sugar and again grinding the resultant mixture.

6. The process of making a composition of material which comprises treating naphthalene with sodium hydroxide, sodium phosphate and ammonium carbonate; treating anthracene with sulphuric acid and sodium hydroxide and adding phosphate rock; grinding the two above enumerated mixtures together, and thereupon adding sugar to the resultant product and grinding further.

7. A composition of materials comprising substantially 21 parts of anthracene, 3 parts calcium phosphate as phosphate rock, 133 parts naphthalene, 58 parts sodium hydroxide, 10 parts sodium phosphate, 10 parts ammonium carbonate, and 20 parts of sugar.

8. A composition of material comprising the reaction products resulting from the admixture of substantially 21 parts of anthracene, 3 parts calcium phosphate as phosphate rock, 133 parts naphthalene, 58 parts sodium hydroxide, 10 parts sodium phosphate, 10 parts ammonium carbonate, and 20 parts sugar.

In witness whereof, I have hereunto subscribed my name.

ALBERT H. ACKERMAN.